United States Patent
Birchfield (10) Patent No.: US 7,090,291 B2
(45) Date of Patent: Aug. 15, 2006

(54) COMBINATION CHILD VEHICLE SEAT AND TEMPORARY STROLLER

(76) Inventor: Daphne D. Birchfield, 11237 Liberty Landing Dr., Florissant, MO (US) 63033

( * ) Notice: Subject to any disclaimer, the term of this patent is extended or adjusted under 35 U.S.C. 154(b) by 0 days.

(21) Appl. No.: 11/177,271

(22) Filed: Jul. 9, 2005

(65) Prior Publication Data

US 2005/0253349 A1    Nov. 17, 2005

Related U.S. Application Data

(63) Continuation-in-part of application No. 10/659,474, filed on Sep. 10, 2003, now abandoned.

(60) Provisional application No. 60/409,304, filed on Sep. 10, 2002.

(51) Int. Cl.
*A47C 13/00* (2006.01)

(52) U.S. Cl. .......................... 297/118; 297/130; 280/30

(58) Field of Classification Search ................ 297/118, 297/130; 280/30 X, 639, 642, 643, 648, 280/650
See application file for complete search history.

(56) References Cited

U.S. PATENT DOCUMENTS

| | | | | |
|---|---|---|---|---|
| 4,113,306 A | * | 9/1978 | von Wimmersperg | 297/130 |
| 4,647,054 A | * | 3/1987 | Chong | 280/30 |
| 4,685,688 A | | 8/1987 | Edwards | 280/30 |
| 4,736,959 A | | 4/1988 | Van Steenburg | 280/30 |
| 4,872,692 A | | 10/1989 | Steenburg | 280/30 |
| 4,946,180 A | | 8/1990 | Baer | 280/39 |
| 5,022,669 A | * | 6/1991 | Johnson | 280/30 |
| 5,104,134 A | | 4/1992 | Cone | 280/30 |
| 5,188,380 A | | 2/1993 | Tucek | 280/30 |
| 5,318,311 A | | 6/1994 | Bofill | 280/30 |
| 5,595,393 A | | 1/1997 | Batten | 280/30 |
| 6,237,995 B1 | | 5/2001 | Dierickx | 297/130 |
| 2001/0009325 A1 | | 7/2001 | Thiele | |
| 2002/0038967 A1 | | 4/2002 | Brandler | |
| 2002/0060444 A1 | | 5/2002 | Cote | |
| 2002/0063450 A1 | | 5/2002 | Washizuka et al. | |
| 2002/0105154 A1 | | 8/2002 | Henselder | |
| 2003/0015895 A1 | | 1/2003 | Hou | |

FOREIGN PATENT DOCUMENTS

| | | |
|---|---|---|
| EP | 0639490 | 2/1995 |
| JP | 6144091 | 5/1994 |
| JP | 2002036923 | 2/2002 |

\* cited by examiner

*Primary Examiner*—Anthony D. Barfield
(74) *Attorney, Agent, or Firm*—Haverstock, Garrett & Roberts LLP (57) ABSTRACT

The combination child vehicle seat and temporary stroller is provided with wheel assemblies having wheels aligned in tandem, which, when retracted, maintain a flush vehicle seat underside which can be used as a vehicle seat without damaging the seat covering. The combination is provided with a handle having a hand grip which extends and locks in to place for use as a stroller, and retracts and locks in to place for use as a vehicle seat.

8 Claims, 7 Drawing Sheets

COMBINATION CHILD VEHICLE SEAT AND TEMPORARY STROLLER

This application is a continuation-in-part of U.S. application Ser. No. 10/659,474, filed Sep. 10, 2003, now abandoned.

This application claims the benefit of U.S. Provisional Patent Application Ser. No. 60/409,304, filed Sep. 10, 2002.

BACKGROUND OF INVENTION

This invention relates generally to equipment for transporting children, and more particularly to an apparatus which can serve as a vehicle seat for a child, and alternatively as a stroller.

Lawmakers and safety conscious groups want to educate motorists of the need for transporting children safely in a vehicle. This requires the parents to have, not only a vehicle seat for transportation while in the vehicle, but also a stroller for use at their destination.

This problem is being addressed by providing a device which operates as both. This device focuses mainly on infants, zero to one year old. Many parents find it inconvenient to transfer the infant from the car seat to the stroller and vice versa. This device is equipped to give the parents an option of carrying the car seat or adjusting the car seat to enable it to be rolled to their destination.

Many accident claims and reports have been filed with car seat companies because the handle detached from the seat, and the seat fell causing injury to the child. This device, being able to be placed low to the ground and rolled, would prevent such falling accidents from happening.

It is therefore an object of this invention to provide a simple and inexpensive vehicle car seat and temporary stroller combination.

In accordance with such object, this invention is intended to allow the parent with a choice of "carry" or "roll".

This invention is further intended to provide constructions that satisfy standards for standard regulation car seats, as we know them, and also provide such seats with a convenient, adjustable handle and with retractable wheels, for a safe and easy fit into a vehicle.

Additionally this invention is intended to allow a sleeping child to remain in the seat, without having to be disturbed, when the seat is removed from the vehicle and rolled to a destination.

This invention, in some embodiments, is also intended to provide a full length "Peek-a-boo" canopy in inclement weather, and also to keep child safe from any flying debris while being rolled.

This invention, in some embodiments, is further intended to provide spring action wheels for the seat to absorb shocks while the seat is being rolled on rough terrain.

Further, this invention, in some embodiments, is intended to keep an adjustable handle from accidentally being extended while carrying a child by using "Butterfly bolts" to lock the handle into place while it is extended or retracted.

Another intent of this invention, in some embodiments, is to allow the handle to be conveniently and desirably positioned at the foot or head of stroller.

This invention, in some embodiments, is also intended to supply a brake at the base of the wheels, to allow the car seat to remain secure and in place while the car seat is not mobile.

Still other objects, advantages, distinctions and alternative constructions and/or combinations of the invention will become more apparent from the following description with respect to the appended drawings. Similar components and assemblies are referred to in the various drawings with similar alphanumeric reference characters. This description should not be literally construed in limitation of the invention. Rather, the invention should be interpreted within the broad scope of the further appended claims.

SUMMARY OF THE INVENTION

This invention combines and incorporates features such as are found in already existing regulation car seats with features found in various other devices, so as to obtain a resultant construction that realizes the objects and the advantages sought for the invention, with just a few minor adjustments relative to existing regulation car seats. The invention employs a handle that is similar in many respects to, but modified from, a standard car seat handle so as to extend and retract for rolling or carrying the car seat. The handle of the resultant construction is also preferably able to be positioned at the head or foot of the car seat, allowing the child to face to or away from the parent. The handle is preferably also equipped with a hand grip for easy maneuvering. The invention has wheels that can be folded up into the base of the car seat for storage or locked down for rolling. The invention is preferably also equipped with spring action wheels which absorb shocks while rolling. The sides of the construction are preferably higher to keep the child's arms and legs from hanging over the sides. In a preferred form, the invention is additionally equipped with a wheel brake, similar to a stroller brake, which allows the construction to remain in place when it is not mobile.

In one highly advantageous embodiment of the invention, a full length, "Peek-a-boo" canopy is provided. The canopy covers the entire length of the car seat. It is equipped with a "Peek-a-boo" window that allows the parent to monitor the child. The canopy protects against inclement weather as well as debris while the child is being rolled.

In another embodiment of the invention, the handles are adjustable and lockable into place with butterfly bolts. The butterfly bolts prevent the handles from being accidentally released. Manual manipulation of the butterfly bolts is needed to lock the handle in its extended or retracted positions.

BRIEF DESCRIPTION OF THE DRAWINGS

Comprehension of the invention is facilitated by the reading of the following detailed description, in conjunction with the annexed drawings, in which.

DETAILED DESCRIPTION OF THE PREFERRED EMBODIMENT

Figure 1:
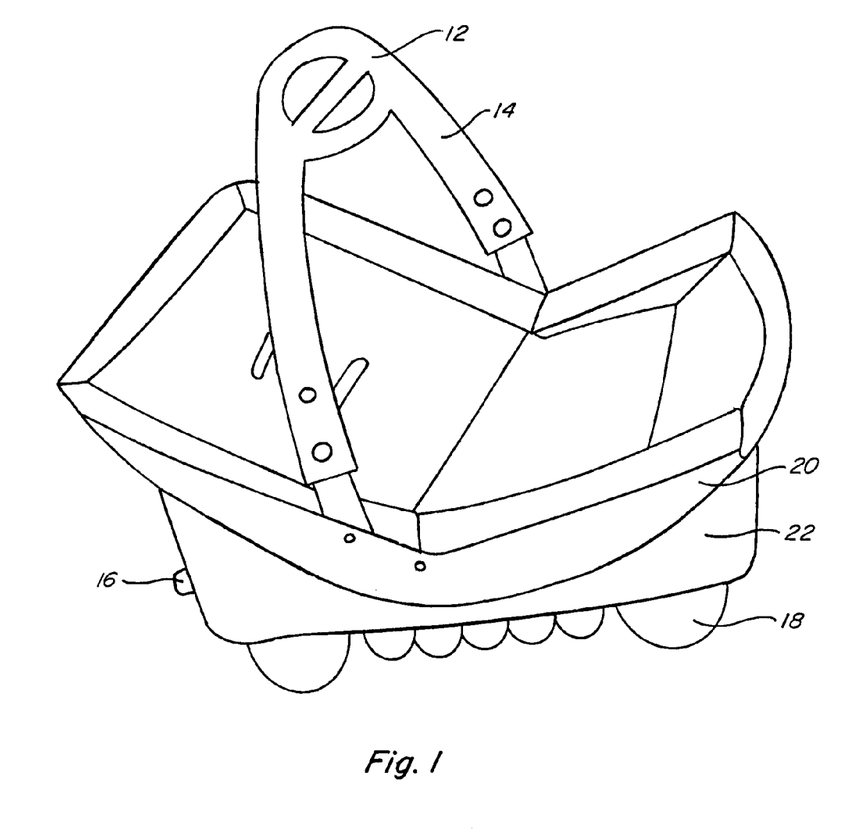
FIG. 1 is an illustration of a standard regulation car seat with invention modifications shown.

In FIG. 1 a hand grip 12 is included as part of handle 14 and is arranged for easy carrying or pushing. Handle 14 extends upward for easy use when rolling. A wheel brake 16 may keep the wheels 18 stationary when the car seat 10 is not mobile. Stepping on the wheel brake 16 causes it to clamp down on the back wheels, impeding the movement of the car seat 10. The car seat portion 10 includes higher sides 20 to protect a child's arms and legs while the car seat 10 is rolling. The wheels 18 fold into a recess 23 (not shown in FIG. 1) within a base 22 of the car seat 10 to allow the car seat to fit smoothly into a vehicle without damaging the car's interior. The wheels 18 lock down and into place for rolling.

Figure 2:
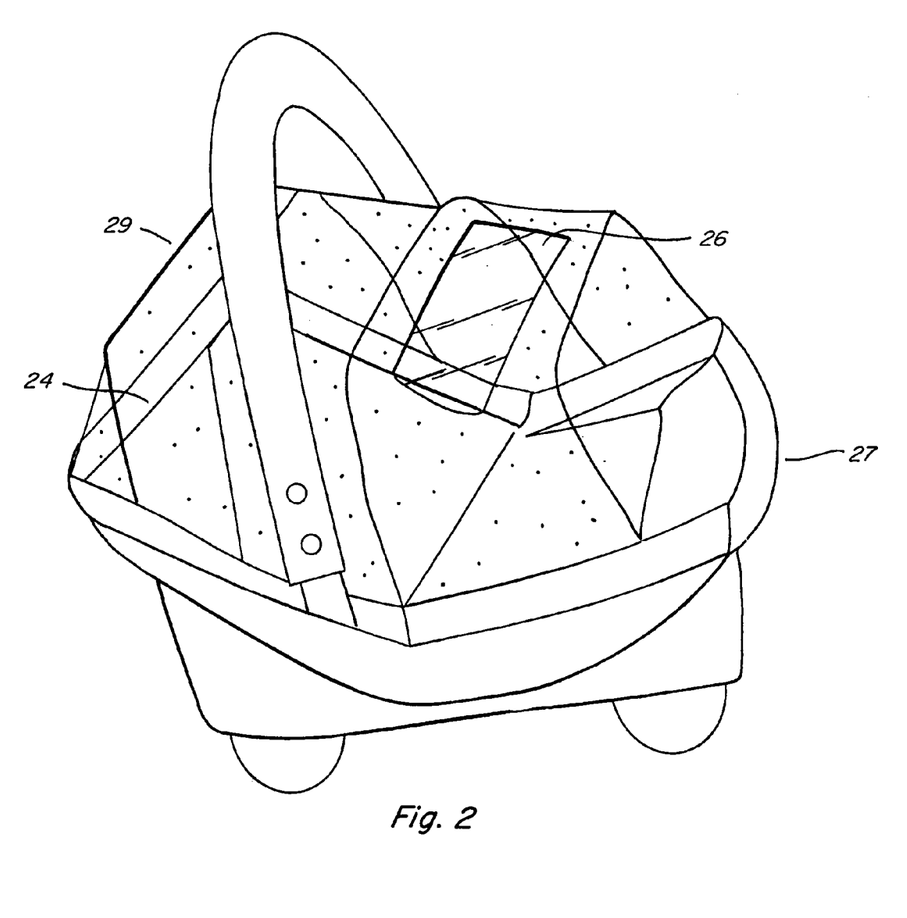
FIG. 2 illustrates the full length, "Peek-a-boo" canopy, with window.

In FIG. 2 a full length, pull-over canopy 24 is provided to cover the child in inclement weather and to protect the child from debris while the car seat is rolling. When the canopy 24 is not in use it can be folded down to the foot 27 or up to the head 29 of the car seat 10. A "Peek-a-boo" window 26 in the canopy 24 is used to monitor the child and also allows the child to see the parent.

Figure 3:
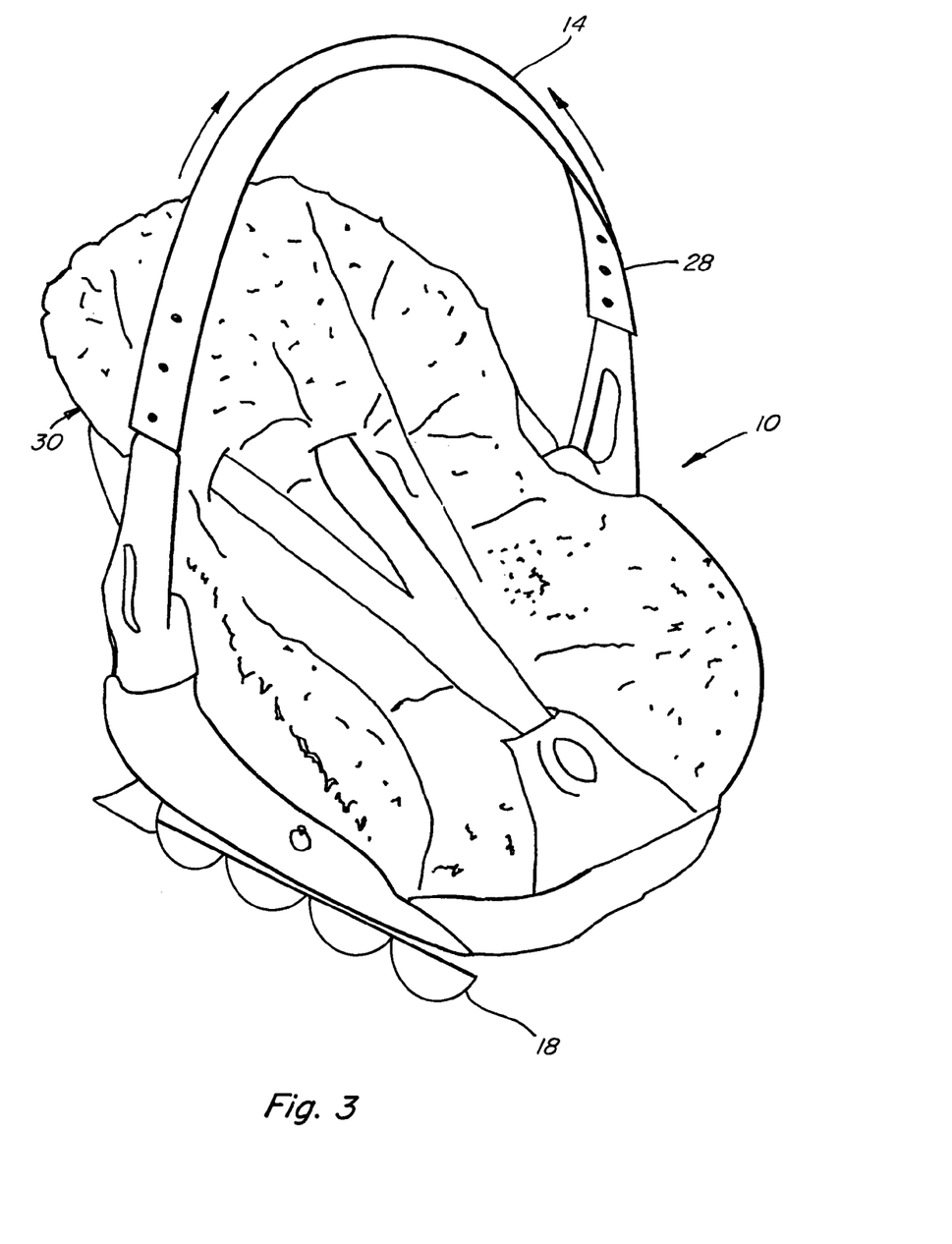
FIG. 3 illustrates a version of a standard regulation car seat with invention modifications shown in three dimensions.

FIG. 3 is a view similar to FIG. 1 depicting a similar embodiment to that of FIG. 1 in three dimensions. FIG. 3 shows the car seat 10 converted into the stroller 30. Wheels 18 are included on the underside, and the handle 14 is modified from a conventional car seat handle to provide a multi-level adjustment 28, to allow the user to place the handle 14 at a comfortable height position.

Figure 4A:
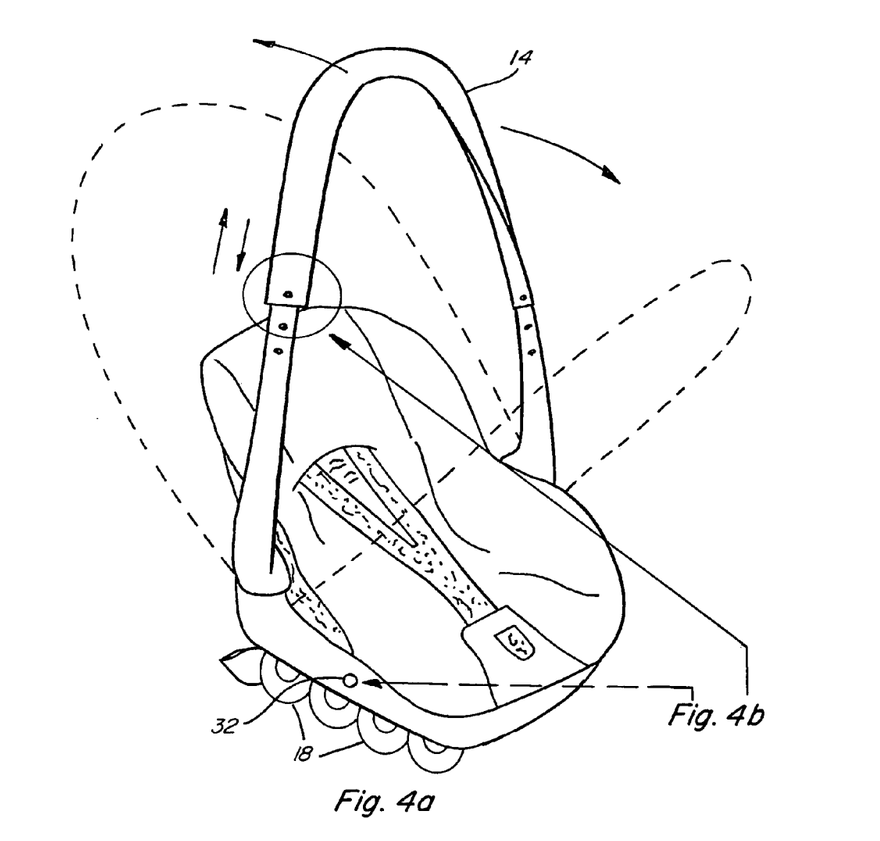
FIG. 4a depicts an embodiment showing the handle in an extended position, with front or rear positioning and the wheel brake.

FIG. 4a depicts an embodiment with the handle 14 extended to its longest position and the wheels locked down for rolling. Wheels 18, in this embodiment, in-line wheels, are provided and positioned parallel to one another on both sides of the underside of the car seat 10. The wheels 18 are preferably equipped with spring action to absorb shocks encountered when the car seat 10 is rolling.

Figure 4B:
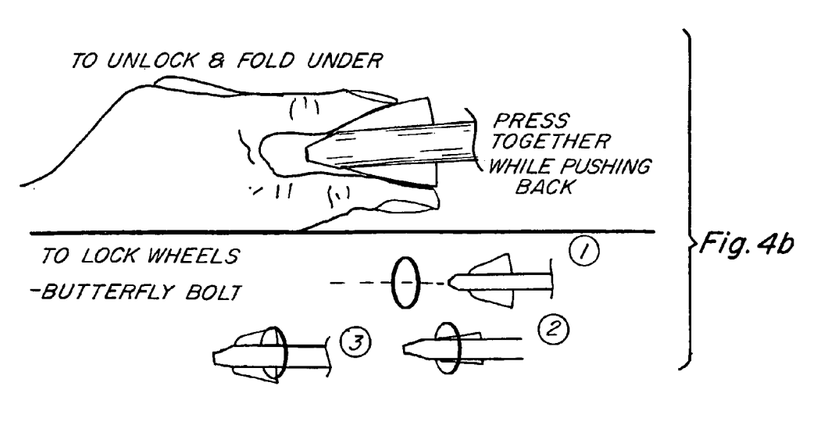
FIG. 4b illustrates the butterfly bolt to lock and unlock wheels and handles.

FIG. 4b illustrates the use of butterfly bolts 32. Butterfly bolts 32 may be used to secure the handle 14 and wheels 18 when in carrying or rolling positions. Although butterfly bolts 32 are used in this embodiment of the invention, other devices and methods known in the art can also be used.

Figure 4C:
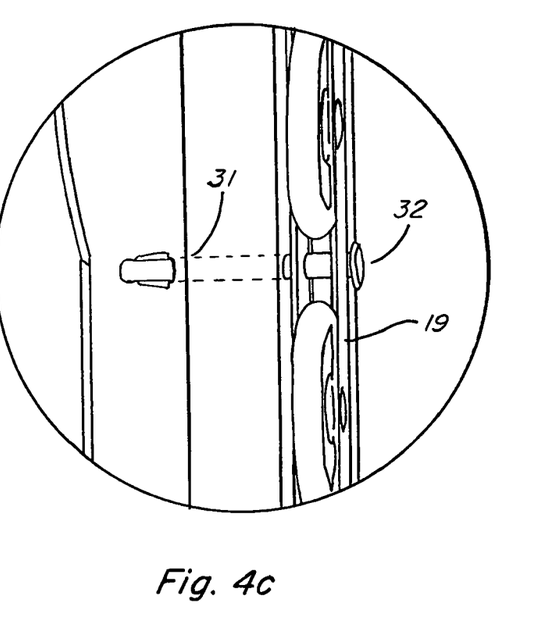
FIG. 4c is an enlarged version of the wheel assembly and locking pin shown in the wheels down position.
Figure 4D:
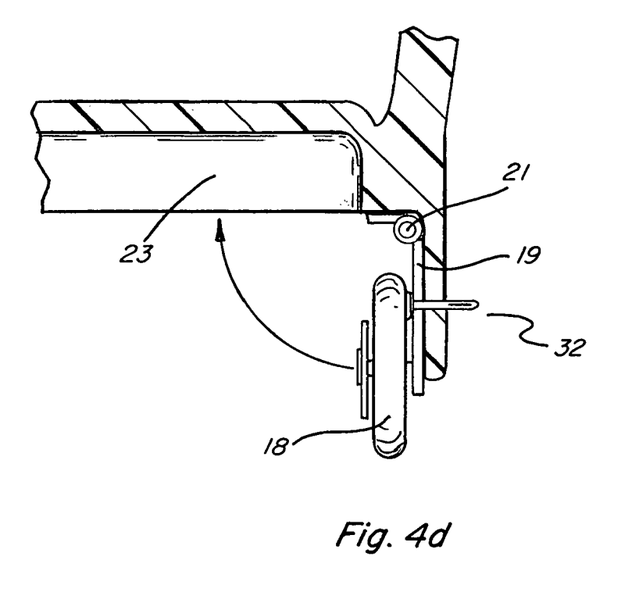
FIG. 4d is a view of the wheel assembly and butterfly bolt shown in the wheels down position.
Figure 5:
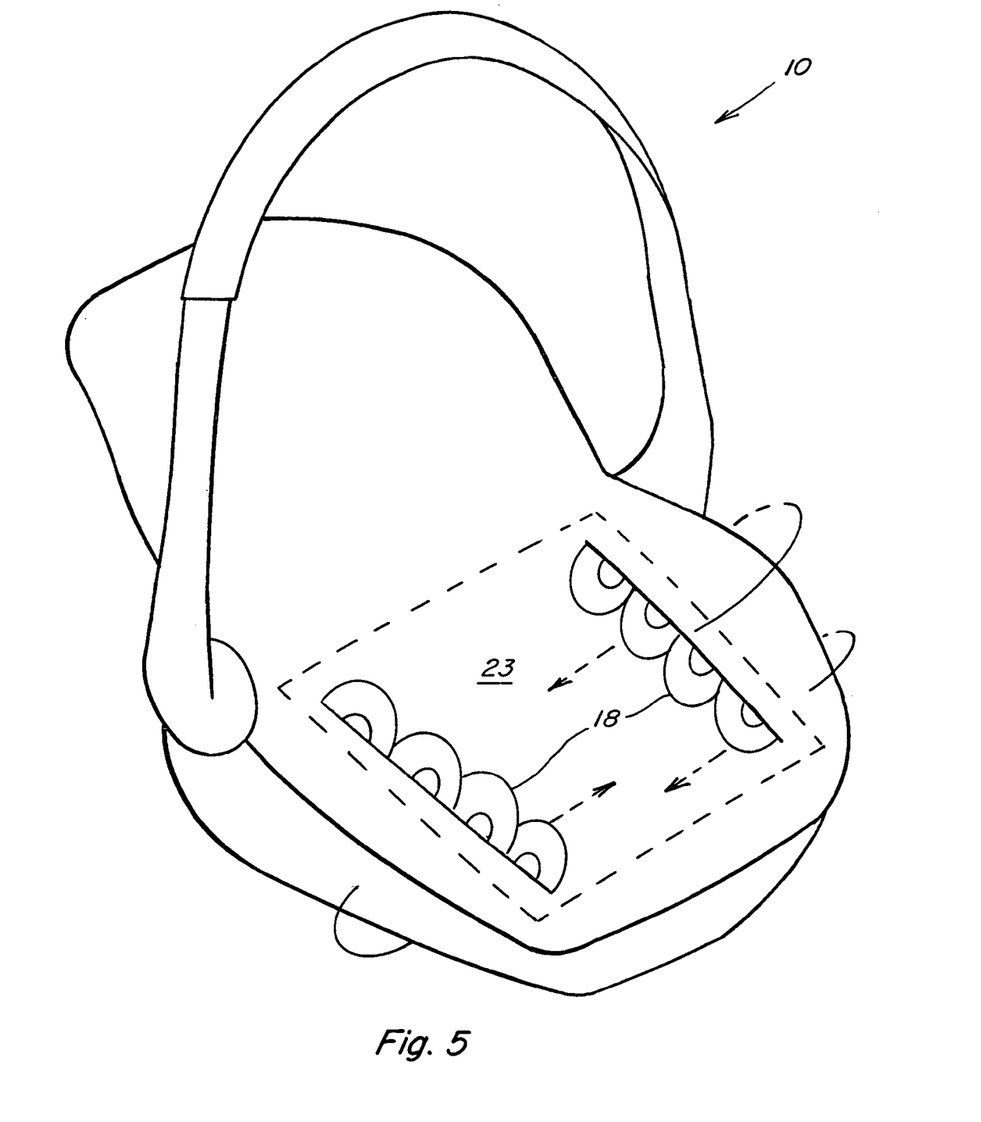
FIG. 5 illustrates wheel placement when the wheels are retracted into the recess and the seat is ready to be placed in the vehicle.

The wheels 18 may be mounted on a wheel assembly 19 which may be pivoted around a hinge 21 into the recess 23 on the underside of the car seat base 22 as shown in FIGS. 4c, 4d, and 5. When pivoted into the recess 23, the wheels 18 and wheel assembly 19 may be held tightly in place by the geometry of the confined space of the recess 23 under the car seat 10. Alternately the wheels 18 can be unfolded from underneath the car seat 10 as shown in FIGS. 1–4. The wheels 18 and wheel assembly 19 may be manually put into the rolling position from the recess 23 under the car seat 10 while the seat is still inside the car. For additional safety, the wheels 18 and/or wheel assembly 19 may be locked into place by extending a butterfly bolt 32 through the wheel assembly 19 and an aperture 31 in the car seat base 22 as shown in as shown in FIGS. 4c and 4d. Using this additional safety feature, the wheels 18 or wheel assembly 19 can only be unlocked, for folding into the recess 23, by manually pressing the wings of the butterfly bolt 32 and removing the butterfly bolt 32 from the wheel assembly 19 and the car seat base 22. The butterfly bolt 32 may remain in the car seat base 22 or wheel assembly 19 when not in use.

Various alternate methods for retracting and locking wheels located on undersides of various devices are known in the prior art, such as those found in patents relating to skates that can be converted into shoes, including: U.S. Pat. No. 3,983,643 to Schreyer et al., U.S. Pat. No. 4,333,249 to Schaefer, U.S. Pat. No. 5,398,970 to Tucky, U.S. Pat. No. 5,797,609 to Fichepain, U.S. Pat. No. 5,803,469 to Yoham, U.S. Pat. Nos. 6,120,039 and 6,343,800 to Clementi, U.S. Pat. No. 6,336,644 to Chu, U.S. Pat. No. 6,394,468 to Chiang et al, and U.S. Pat. No. 6,634,656 to Gervasoni.

In alternate embodiments, the wheel assembly may fold into the recess 23 using the hinge assembly of Yoham. Another possibility is the use of the hinge and wheel assembly of Gervasoni wherein the wheel assembly pivots about an axis passing through a portion of the wheels. Wheels mounted within individual wheel holders, such as those found in Chiang et al., may be attached on the underside of the base 22 and manually deployed and retracted. Other known methods for deploying and retracting wheels or wheel assemblies into a recess may also be employed in yet more embodiments.

FIG. 5 is a partial cutaway view showing the wheels 18 folded into the recess 23 of the base 22 for placement of the car seat 10 in a vehicle. In this embodiment, the wheels 18 are mounted on a wheel assembly 19 so they can be folded into the recess 23 manually, or by use of a mechanical retraction method. The geometry of the recess 23 is such that the wheels 18 or wheel assembly 19 may fit snugly into place. If the recess is too large to create a tight fit, or if more security is desired, a locking mechanism may be added to hold the wheels 18 or wheel assembly 19 in place.

Figure 6:
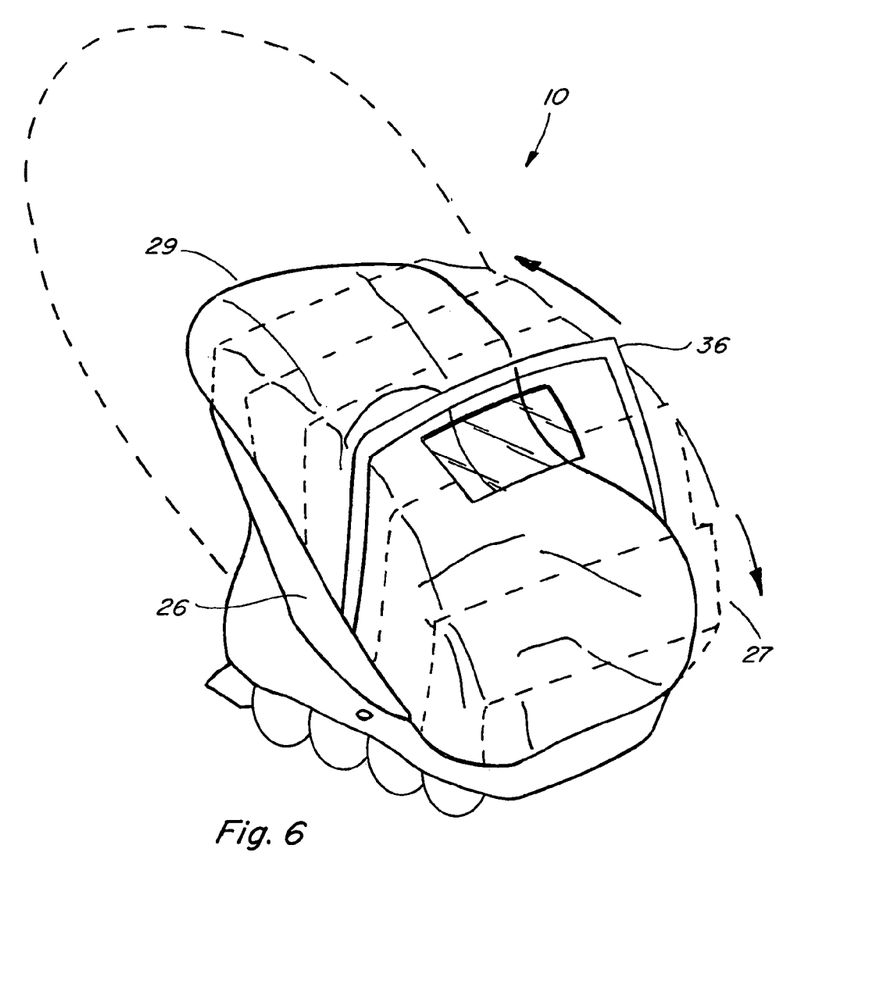
FIG. 6 further describes the "Peek-a-boo" canopy and its attributes.

FIG. 6 is another view showing the use of a "Peek-a-boo" canopy 26 having various other attributes. The canopy may utilize water repellent fabric and include a clear plastic window 26. As shown in FIG. 6, an expandable canopy 34 is attached, at its center, to a bar 36 and is extendible or expandable in both directions. When the center bar is rotated to the mid-point of the seat, the canopy 34 can be pulled up to cover the top half of the car seat 10, pulled down to cover the bottom half of the car seat, or extended or expanded towards both the top 29 and the bottom 27 to cover the entire car seat. When not in use the canopy 34 may fold together at the bar 36, and the bar 36 can be rotated down to foot 27 of car seat 10. Although this particular type of canopy is well suited for the intended purposes, other canopy configurations, known generally in the art, can also be used.

This invention has all the advantages of a car seat in that it can be used with the wheels stored underneath in the conventional manner. The car seat can be used in the car and removed as a conventional car seat. It can easily and quickly be converted to a stroller for transporting the baby relatively short distances, thereby offering freedom from carrying the weight of the child plus the additional weight of the seat. Additionally, the risk of the child falling or being dropped is eliminated because the car seat is rolled along instead of carried along. When used as a stroller, this invention enjoys the additional safety features of a car seat, such as impact resistant construction and the five point restraint system to hold the baby safely in place. The extending handle provides the convenience of a stroller, and the ability to position the handle at the top or the bottom of the seat gives the user the choice of stroller or carriage orientation.

Although the invention has been described in terms of specific embodiments and applications, persons skilled in the art can, in light of this teaching, can generate additional embodiments without exceeding the scope or departing from the spirit of the claimed invention. In addition, specific features of the invention are shown in some drawings and not in others for convenience only, as each feature may be combined with any or all of the other features in accordance with the invention. Accordingly, it is to be understood that the drawings and description in this disclosure are proffered to facilitate comprehension of the invention and should not be construed to limit the scope thereof.

What is claimed is:

1. A combination child vehicle seat and temporary stroller assembly comprising:
    a shell, sized and configured to hold a baby having
        an inside with a seat portion with a laterally situated front end and a reclined back end,
        a pair of opposite sides adjacent said seat portion joining said front end and said back end, said opposite sides having a handle extending therebetween, said handle having a hand grip at the approximate midpoint of said handle,
        an underside portion laterally situated below said front end of the seat portion, said underside portion having a recess therein,
    at least one wheel assembly disposed on said underside portion;
        said wheel assembly having wheels arranged in tandem, said wheel assembly being movable between a use position and a storage position, said wheel assembly being storable in said recess when not in use.

2. The combination child vehicle seat and temporary stroller assembly of claim 1 wherein said seat portion is coverable with a canopy.

3. The combination child vehicle seat and temporary stroller assembly of claim 2 wherein said canopy comprises:
    a center bar affixed between said side portions and rotatable from a position adjacent said front of the seat portion to a point midway between said front of the seat portion and said back of the seat portion,
    a front canopy portion with a first end and a second end connected at said first end at said center bar and at said second end near said front of the seat portion,
    a back canopy portion with a first end and a second end connected at said first end at said center bar and at said second end near said back of the seat portion.

4. The combination child vehicle seat and temporary stroller assembly of claim 1 wherein said handle is pivotable from a position near said front of the seat portion to a position near said back of the seat portion.

5. The combination child vehicle seat and temporary stroller assembly of claim 1 wherein said handle is extendable from its initial position.

6. The combination child vehicle seat and temporary stroller assembly of claim 5 wherein said handle is extendable from its initial position and said handle is lockable in at least one extended position.

7. A combination child vehicle seat and temporary stroller assembly comprising:
    a shell, sized and configured to hold a baby having
        a seat portion with a pair of opposite sides adjacent said seat portion having a handle extending therebetween, said handle having a hand grip at the approximate midpoint of said handle,
        an underside portion having a recess therein,
    two wheel assemblies arranged parallel to one another and parallel to said opposite side portions attached to said underside portion,
        said wheel assemblies having wheels arranged in tandem, said wheel assemblies being movable between a use position and a storage position, said wheel assembly being storable in said recess when not in use.

8. A combination child vehicle seat and temporary stroller assembly comprising:
    a shell, sized and configured to hold a baby having
        an inside with a seat portion with a laterally situated front end and a reclined back end,
        a pair of opposite sides adjacent said seat portion joining said front end and said back end, said opposite sides having a handle extending therebetween, said handle having a hand grip at the approximate midpoint of said handle,
        an underside portion laterally situated below said front end of the seat portion, said underside portion having a recess therein,
    at least one wheel assembly disposed on said underside portion;
        said wheel assembly having wheels arranged in tandem and being movable between a use position and a storage position, said wheel assembly being storable in said recess when not in use.

* * * * *